(12) United States Patent
Kimura

(10) Patent No.: US 8,655,584 B2
(45) Date of Patent: Feb. 18, 2014

(54) MAP DATA UTILIZATION APPARATUS

(75) Inventor: Hiroki Kimura, Anjo (JP)

(73) Assignee: DENSO CORPORATION, Kariya (JP)

( * ) Notice: Subject to any disclaimer, the term of this patent is extended or adjusted under 35 U.S.C. 154(b) by 1270 days.

(21) Appl. No.: 11/905,184

(22) Filed: Sep. 28, 2007

(65) Prior Publication Data

US 2008/0082260 A1    Apr. 3, 2008

(30) Foreign Application Priority Data

Oct. 3, 2006    (JP) ................................. 2006-271823

(51) Int. Cl.
*G01C 21/00*    (2006.01)
*G08G 1/123*    (2006.01)

(52) U.S. Cl.
USPC ..................................... 701/450; 340/995.12

(58) Field of Classification Search
USPC ......... 701/200–226, 400, 509, 540, 408–475, 701/24; 340/988–996
See application file for complete search history.

(56) References Cited

U.S. PATENT DOCUMENTS

| | | | |
|---|---|---|---|
| 5,951,620 A | 9/1999 | Ahrens et al. | |
| 6,018,695 A | 1/2000 | Ahrens et al. | |
| 6,131,066 A | 10/2000 | Ahrens et al. | |
| 6,289,276 B1 | 9/2001 | Ahrens et al. | |
| 6,823,255 B2 | 11/2004 | Ahrens et al. | |
| 7,471,995 B1 * | 12/2008 | Robinson | 701/3 |
| 2004/0246244 A1 * | 12/2004 | Nose | 345/204 |
| 2006/0122768 A1 * | 6/2006 | Sumizawa et al. | 701/208 |
| 2006/0258397 A1 * | 11/2006 | Kaplan et al. | 455/556.1 |

FOREIGN PATENT DOCUMENTS

| | | |
|---|---|---|
| JP | A-10-62202 | 3/1998 |
| JP | A-2000-036097 | 2/2000 |
| JP | A-2003-185442 | 7/2003 |
| JP | A-2003-315054 | 11/2003 |
| JP | A-2004-125509 | 4/2004 |
| JP | A-2006-330020 | 12/2006 |

OTHER PUBLICATIONS

Office Action dated Apr. 3, 2012 in corresponding JP Application No. 2006-271823 (and English translation).

* cited by examiner

*Primary Examiner* — Muhammad Shafi

(74) *Attorney, Agent, or Firm* — Posz Law Group, PLC

(57) ABSTRACT

A map data utilization apparatus retrieves a version information of map data for a specific area when a current position of a vehicle is updated. Then, the version information of the map data of the specific area is compared with a version information of the map data of an identical area in a version list that is retrieved in advance for map data updating. When the version of the map data in the version list is different from the one of the map data of the specific area, an inquiry screen is displayed on a display unit for inquiring a user whether the map data is updated. When an update is instructed by the user, map data update data is acquired from an information center, and the map data of the specific area is updated by using the map data update data.

9 Claims, 2 Drawing Sheets

MAP DATA UTILIZATION APPARATUS

CROSS REFERENCE TO RELATED APPLICATION

The present application is based on and claims the benefit of priority of Japanese Patent Application No. 2006-271823 filed on Oct. 3, 2006, the disclosure of which is incorporated herein by reference.

FIELD OF THE DISCLOSURE

The present disclosure generally relates to a map data utilization method and apparatus for use in a vehicle.

BACKGROUND INFORMATION

Conventionally, a navigation system that executes various processes based on map data in a storage medium is, for example, capable of updating the map data in the storage medium by acquiring a newer version of the map data through a communication with an external resource. In this manner, the usability of map data utilization apparatus including the navigation system is improved.

Japanese patent document JP-A-2003-315054 discloses a navigation system that updates map data by receiving a newer version of the map data of a predetermined area from an external data center for an update of a map in an area-by-area manner. The acquisition of the map data is performed by sending a map data delivery request for an update area of the map to the data center based on a user operation on an operation terminal. The disclosure in the above document claims that the map data acquisition time and cost are reduced in this manner.

The navigation system in the above patent document performs the map data update when a user performs by him/herself an operation that transmits the delivery request. Therefore, the map data stored in the navigation system is kept un-updated when the user does not transmit a request for a newer version of the map data despite of an issuance of the newer version of the map data. In addition, the user is not well informed of an update timing of the map data. As a result, the user has to frequently transmit the request for the latest version of the map data if he/she desires to maintain the map data of the navigation system in an up-to-date condition all the time. The frequent operation for transmitting a map data update request is nothing but inconvenient for the user.

SUMMARY OF THE DISCLOSURE

In view of the above and other problems, the present disclosure provides a technique that updates map data of high demand for a user in a suitable manner without inquiring the user for an update timing.

A map data utilization apparatus of the present disclosure includes a storage that stores map data to be utilized in a process that is executed in the map data utilization apparatus, a communication unit that communicates with an external information center, a list acquisition unit that acquires a version list of the map data for updating respective areas in the map, a map data acquisition unit that acquires map data from the external information center by the communication unit, and a map data update unit that updates the map data of the specific area stored in the storage based on map data that is acquired by the map data acquisition unit for map data updating.

The map data is capable of being updated by an area of a predetermined range in a map, and the map data acquisition unit compares a version of the map data of a specific area with a version of the map data in the version list for map data updating so as to acquire the map data of the specific area when the version of the map data of the specific area is different from the version of the map data of a same area in the version list for map data updating.

By using the map data utilization apparatus, map data of the specific area in the map is appropriately updated at a suitable timing without inquiring of the user about a map data acquisition timing for updating map data. Thus, only the specific area of the map data is maintained to be the latest version with a reduced cost and time for communication in comparison to the update of the map data of a whole map.

The comparison timing of the version of the map data in the storage in the apparatus with the version of map data in the version list and the update area of the map data may be determined based on criteria that the update area is in high demand and high interest in terms of the user needs and that the update of the map data is just in time in terms of the user needs. In this manner, the user needs is accommodated with a reduced communication cost and time for updating the map data.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present disclosure are described with reference to the accompanying drawings.

(Explanation of Navigation Apparatus 1)

Figure 1:
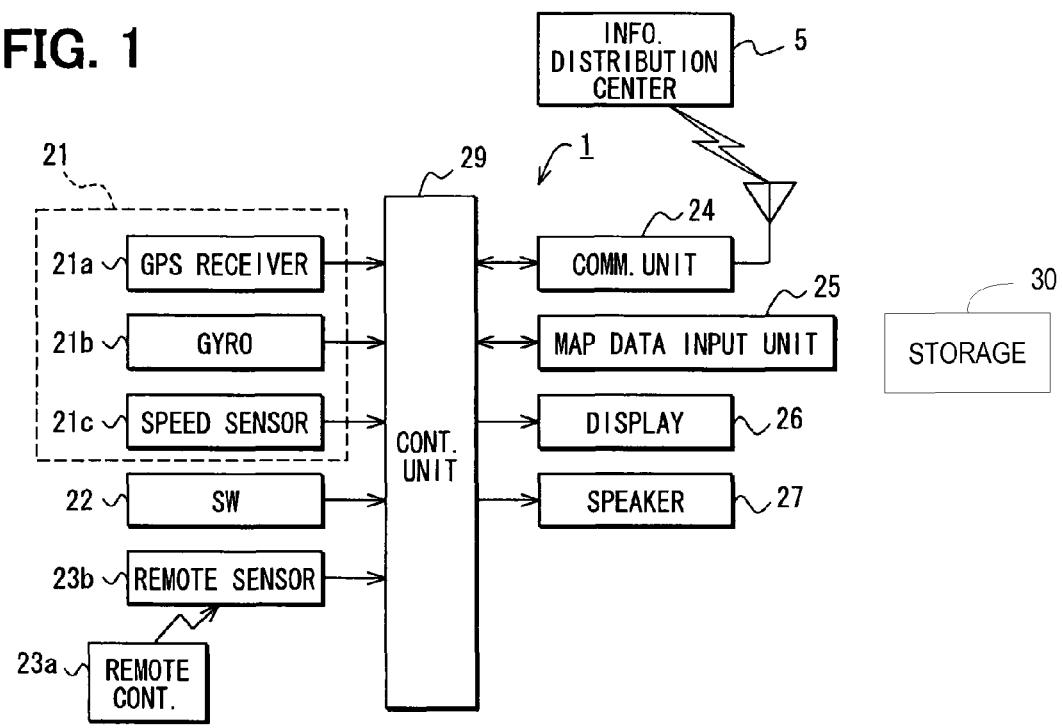
FIG. 1 shows a block diagram a navigation apparatus in an embodiment of the present disclosure.

FIG. 1 is a block diagram showing an outline configuration of a navigation apparatus 1 for use in a vehicle in an embodiment of the present invention.

The navigation apparatus 1 includes a position detector 21 for detecting a current position of the vehicle, operation switches 22 for inputting various instructions, a remote control terminal (a remote controller) 23a for inputting various instructions just like the operation switches 22, a remote control sensor 23b for inputting signals from the remote controller 23a, a communication unit 24 for communication with an external information distribution center 5, a map data input unit 25 for inputting map data or the like from an external recording medium and for storing the data in a storage 30, a display unit 26 for displaying map or the like, a sound output unit (speaker) 27 for outputting various guidance voice or the like, and a control unit 29 for controlling those parts.

The position detector 21 includes a global positioning system (GPS) receiver 21a that receives a transmission of an electric wave from a man-made satellite through a GPS antenna for determining a position of the vehicle, a gyroscope 21b that outputs detection signals according to an angular velocity of rotational movement of the vehicle, and a speed sensor 21c that outputs detection signals according to a speed of the vehicle. The sensors 21a~21c have respectively different errors inherent to the characteristics of the device, thereby being configured to serve with each other for correcting errors in a compensatory manner. In this case, only one or more of the above sensors may be used based on their accuracy, or other sensors such as a steering angle sensor, a tire sensor on each tire or the like may also be used.

The operation switches 22 are switches such as mechanical switches or touch switches on a screen of or around the display unit 26 or similar devices. The communication unit 24 receives a version list of map data or map data itself for map data update from the external information distribution center 5 through information communication with the information distribution center 5, and inputs the received map data to the control unit 29. In this case, the communication unit 24 may be configured to have communication with the information distribution center 5 through networks such as Internet or the like. In addition, the information distribution center 5 is equipped with servers (not illustrated in the figure) for managing data as well as communication terminals (not illustrated in the figure) for having communication through communication lines, and accommodates the information communication with the navigation apparatus 1 through the communication terminals. The information distribution center 5 distributes, upon having requests from the navigation apparatus 1, the version list of the map data and the map data for updating maps that are stored in the server.

The map data input unit 25 reads data from a nonvolatile storage medium (e.g., storage 30), and the data is input to the control unit 29 under control of the control unit 29. The data stored in the nonvolatile storage medium (storage 30) memorizes are so-called map matching data for improving position detection accuracy enhancement of statement as well as the map data, route navigation data, a program for operating the navigation apparatus 1 and the like. As for the data storage media, the nonvolatile memory medium (storage 30) with rewritable characteristics such as a hard disk, a flash memory, a memory card and the like are used.

The map data memorized in the storage medium (storage 30) is divided into areas having a predetermined area size for an update of the contents. As for the predetermined area size, grid areas with a predetermined divider interval (e.g., several to dozens of kilometers), a predetermined administration division or a combination of plural administration divisions may be used. Further, the map data may include data regarding points of interest to provide information on specific facilities and places.

The display unit 26 is a color display device having a display surface made of a liquid crystal or the like. The display unit 26 is capable of displaying various images in the display surface depending on the input of a picture signal from the control unit 29. For example, while the vehicle is traveling, the display unit 26 serves as a navigation screen by displaying a vehicle icon based on a current vehicle position detected by the position detector 21 and other symbols such as a navigation route, a name, a landmark and the like superposed on top of a map that is inputted from the map data input unit 25.

The sound output unit (speaker) 27 is constituted so that various information is notified for a user by using a sound, thereby enabling a guidance provision through both of an image from the display unit 26 and a sound from the sound output unit 27.

The control unit 29 consists mainly of a central processing unit (CPU), a ROM, a RAM, an I/O and bus lines connecting these components, and controls these components in a unified manner. The control unit 29 performs various processes according to a program memorized by the ROM or the like.

For example, a map display process and a route guidance process are nominated for navigation-related process. The map display process includes a calculation process of the current vehicle position as a combination of a travel direction and position coordinates based on detection signals from various components in the position detector 21 and a display process of a map image or the like around the current vehicle position on the display unit 26 based on the map data from the map data input unit 25. The route guidance process includes an optimum route calculation process between the current position and a destination based on the map data in the input unit 25 and the destination specified by using the operation switches 22, the remote controller 23a, or the like and a guidance process that guides the user along the calculated route. The optimum route is automatically calculated by using a cost calculation technique such as Dijkstra method or the like. In addition, based on the map data inputted from the input unit 25, the map around a user specified point or around the POI is displayed on the display unit 26.

Further, the control unit 29 compares a version of the map data for use in the various processes described above with a newest version at a predetermined timing, and acquires updated map data from the information distribution center 25 when the updated map data is available. The control unit 29 performs an update process (i.e., "a version list acquisition process" and "a map data update process") that updates the map data in the navigation apparatus 1 by using the acquired updated map data. Details of the map data update process is described later.

(Explanation of the Version List Acquisition Process)

Figure 2:
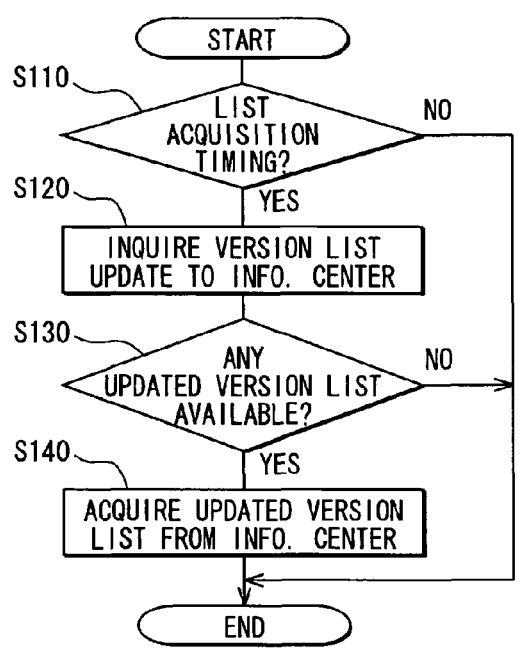
FIG. 2 shows a flowchart of a version list acquisition process in the navigation apparatus.

FIG. 2 is a flowchart showing "the version list acquisition process" which is performed by the control unit 29 of navigation apparatus 1. This process is started when an accessories switch of the vehicle is turned on for supplying an electric power to the navigation apparatus 1 or when a similar procedure is performed.

First, when the version list acquisition process is started, the control unit 29 determines whether a list acquisition timing has arrived (step S110). In this case, the version list is a list of latest versions of the map data for updating map data distributed from the information distribution center 5. More practically, the list of the latest versions of the map data includes version information of the map data in each of the divided area in the map according to a predetermined area division. The version list is updated to reflect the latest version information on a map data distributor side whenever map data for the latest update is published and served for downloading from the information distribution center 5.

In addition, the timing for acquiring the version list in S110 may be set as a predetermined interval such as everyday, every week, every month or the like. The version list may also be acquired at a user defined date and time.

When it is determined that it is not the timing for acquiring the version list in step S110, (S110:NO), the process concludes itself. On the other hand, when it is determined that it is the timing for acquiring the version list (S110:YES), inquiry information for updating the version list to the latest is transmitted to the information distribution center 5 (S120).

Based on a response from the information distribution center 5, it is determined whether it is possible to update the version list currently stored in the storage 30 to the latest version list (S130). When the list is determined to be updated to the latest one (S130:YES), request information for distribution of the version list is transmitted to information distribution center 5 through the communication unit 24, and the latest (i.e., updated) version list from the information distribution center 5 in response is received for overwriting the currently stored version list in the storage 30 (S140). If there is no version list currently in the navigation apparatus 1, the version list is acquired from the information distribution center 5 and is stored in the storage 30.

On the other hand, when it is determined that the latest version list is not available (S130:NO), that is, when there is no version list that is newer than the currently stored version list, the process concludes itself.

(Explanation of Map Data Update Process)

Figure 3:
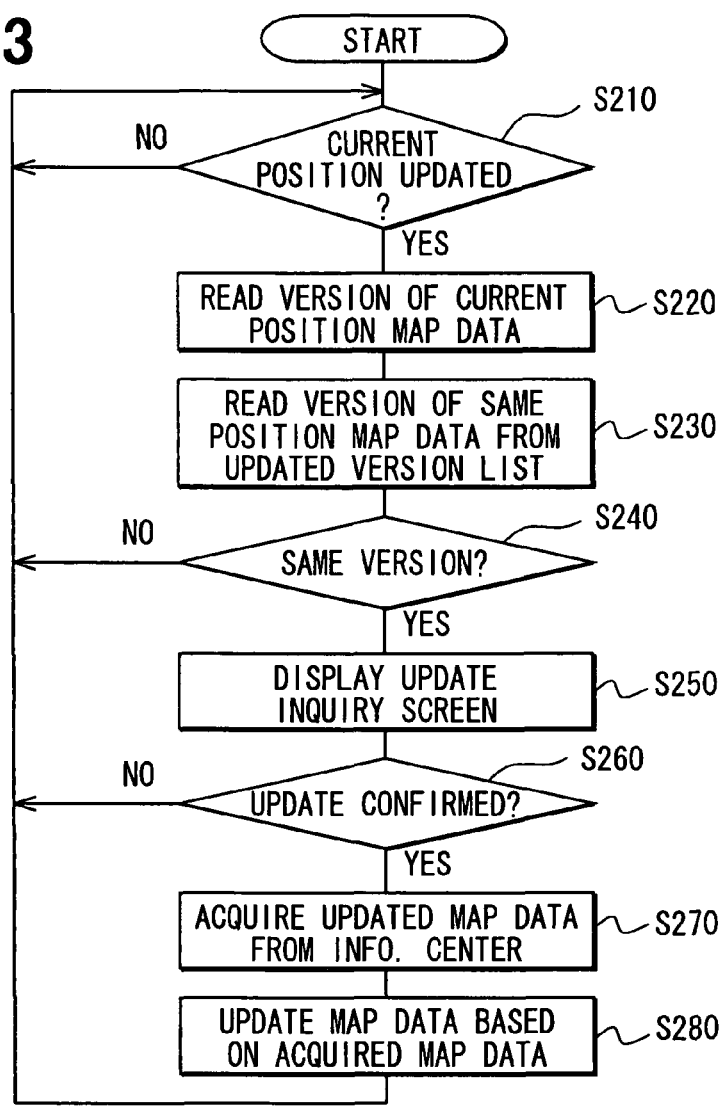
FIG. 3 shows a flowchart of a map data update process in the navigation apparatus.

FIG. 3 shows a flowchart showing "the map data update process" executed in the control unit 29 of the navigation apparatus 1. This process is started when an accessories switch of the vehicle is turned on for supplying an electric power to the navigation apparatus 1 or when a similar procedure is performed. This process is executed in parallel with the map display process and the route guidance process described above.

First, the control unit 29 determines whether a current position of the vehicle is updated by a detection result from the position detector 21 when the map data update process is started (S210). While the current position of the vehicle is determined not to be updated (S210:NO), this process repeats this step. Then, at a timing when the current position of the vehicle is determined to be updated (S210:YES), version information A of the map data of an area that includes the current vehicle position (designated as an update area hereinafter) is read from the map data input unit 25.

Then, the version list acquired in the "version list acquisition process" (FIG. 2) is referred to, and version information B of map data of an area corresponding to the update area for updating the map is read (S230). Then, the version information A of map data of the update area and the version information B of map data of an area corresponding to the update area for updating the map are compared with each other for determining whether those versions are identical (S240).

When the version in the version information A and the version in the version information B are determined to be identical (S240:NO), the process returns to step S210. When the versions are determined not to be identical (S240:YES), the inquiry screen for inquiring an update of the map data (FIG. 4) is displayed on the display unit 26 (S250).

Figure 4:
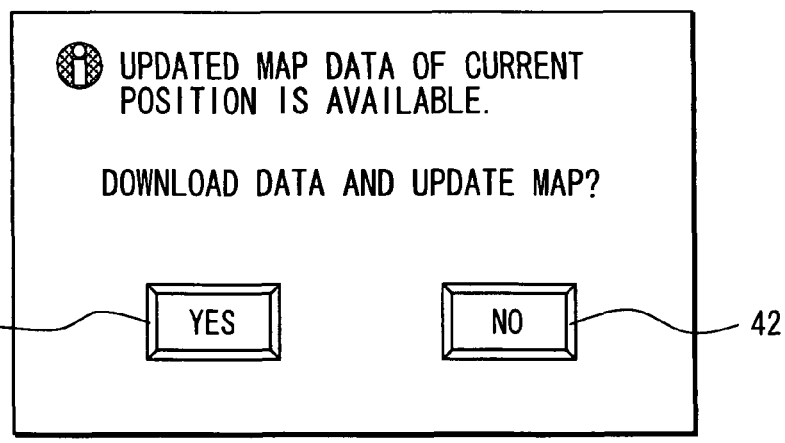
FIG. 4 shows an illustration of an inquiry screen for confirming map data update.

FIG. 4 is an illustration showing an inquiry screen for inquiring a user about the update of map data. The inquiry screen displays a message that update map data of an area around the current vehicle position is available and a message that encourages the user to input whether or not to update the map by downloading the map data as shown in FIG. 4. In addition, "YES" button 41 and "NO" button 42 for accepting a user input of an instruction through a touch panel function on a display surface of the display unit 26 is displayed. The user presses down the "YES" button 41 for allowing the map data update or presses down the "NO" button for not allowing the update when giving an instruction of a map data update to the navigation apparatus 1.

The update instruction from the user is determined in step S260. When it is determined that the update of the map data is not allowed (S260:NO), that is, when "NO" button is pressed down by the user in the inquiry screen (FIG. 4), the process returns to step S210.

On the other hand, when the update of the map data is allowed (S260:YES), that is, when the user presses down "YES" button 41 in the inquiry screen (FIG. 4), a distribution request for the map data of an area corresponding to the update area for updating the map is transmitted to the information distribution center 5 from the communication unit 24, and the map data transmitted from the information distribution center 5 in response for updating the map is acquired (S270). Then, through the map data input unit 25, the map data of the update area is updated (i.e., an upgrade install) based on the acquired map data. The process returns to step S210 after the update of the map data.

The advantage of the navigation apparatus 1 in the above embodiment is summarized as follows. That is, the update of the map data is appropriately executed without having an input from a user, and for only a specific area in the map. In this manner, the map data is maintained to the latest version with a reduced cost and time for map data acquisition.

Further, the map data of in high demand, that is, the map data of the current vehicle position is updated to be the latest version for an improved convenience of the user. Furthermore, the availability of the update of the map data is notified for the user in advance, thereby giving a control of the update to the user without wasting the communication cost/time for an unwanted map data.

(Modification of the Map Data Update Process)

Modification of the "map data update process" (FIG. 3) is explained. The update timing of the map data may be, instead of the update timing of the current position of the vehicle (S210 in FIG. 3), modified to the manner in the following. The update area of the map data (i.e., the area including the current vehicle position, S220 in FIG. 3) may also be modified.

Modification Example 1

When POI information is provided for the user or POI is used as a destination in the route guidance upon having a POI setting regarding specific facilities, a place or the like from the user, the timing when the user inputs the POI may be used as the map data update timing and the area including the POI may be specified as the update area. In this case, in step S210 of the flowchart in FIG. 3, an input for specifying the POI from a user is determined, and in step S220, the version information of the map data corresponding to an area including the POI is read out. The following process handles the area including the POI as the update area.

In this way, the map data of the area including the POI is always maintained to be the latest condition for the convenience of the user when the user searches the POI information, or when the user sets the destination.

Modification Example 2

The update timing may be set to the timing when the geographical range of the map displayed on the display unit 26 changes, and the area including the display range after the change may be set as the update area.

In this case, the change of the display range includes cases such as a jump of the display range from the current display range to another range, a scrolling of the current display range gradually toward another range or the like. The former case is the one that the user sets a point to be included in the display range, or that the scale of the map is changed to the user-specified magnitude, or the like. The latter case is the one that, for example, the display range is changed according to the change of the current vehicle position, or that the display range is gradually changed according to the user operation of an arrow key or the like for changing the display range.

In this case, in step S210 in the flowchart in FIG. 3, whether the geographical range of the map displayed on the display unit 26 is changed as a result of each of the other processes executed in parallel with the map data update process is determined, and in step S220, the version information of the map data of the area that corresponds to the display range after the change is read out. The update area of the map data may be set to include the display range after the change thereafter, and the rest of the process may be executed in the same manner as described above.

In this way, when the display range of the map changes according to the input from the user or according to the movement of the vehicle, the display range after the change, that is, the map data to be viewed actually by the user is maintained to be the latest version for the convenience of the user.

Modification Example 3

Further, the Modification 1 and 2 may be combined with the map data update process in the embodiment above. That is, in step S210 in the flowchart in FIG. 3, the update of the current vehicle position (in the above embodiment) as well as the POI input instruction (Modification 1) and the change of the geographical range of the displayed map (Modification 2) may be determined, and in step S220, the version information of the map data of the area that corresponds to each of the conditions described above may be read out. The update area may be set to the area that satisfies the condition set in step S210 for performing the process described above thereafter.

Modification Example 4

Update mode of the map data may be selected by the user. That is, a mode that automatically acquires and updates the map data without an update inquiry for the user mode when a version of map data for updating differs from a version of map data corresponding to the update area, and a mode that acquires and updates the map data after inquiring the update to the user may be provided for the user's disposal. In this manner, the user's intention to always maintain the map data to be the latest or to specify the update or no update at the occasion of every update is reflected to the update operation.

Although the present invention has been fully described in connection with the preferred embodiment thereof with reference to the accompanying drawings, it is to be noted that various changes and modifications will become apparent to those skilled in the art.

For example, though the embodiment and the modifications are described as an example implemented to the navigation apparatus 1, the present disclosure may also be applied to the apparatus that utilizes map data stored in a memory medium for performing a process other than the route navigation.

Such changes and modifications are to be understood as being within the scope of the present invention as defined by the appended claims.

What is claimed is:

1. A map data utilization apparatus comprising:
a storage that stores map data to be utilized in a process that is executed in the map data utilization apparatus, wherein the map data is capable of being updated by an area of a predetermined range in a map;
a communication unit that communicates with an external information center;
a list acquisition unit that acquires a version list of the map data for updating respective areas in the map;
a map data acquisition unit that acquires map data from the external information center by the communication unit, wherein the map data acquisition unit compares a version of the map data of a specific area with a version of the map data in the version list for map data updating so as to acquire the map data of the specific area when the version of the map data of the specific area is different from the version of the map data of a same area in the version list for map data updating; and
a map data update unit that updates the map data of the specific area stored in the storage based on map data that is acquired by the map data acquisition unit for map data updating,
wherein,
the map data acquisition unit is configured, after the comparison is performed by the map data acquisition unit, when the version of the map data of the specific area is determined to be different from the version of the map data of the same area in the version list for map data updating, before acquiring the map data of the specific area from the external information center, to interact with a user to request a user authorization of downloading to update the map data of the specific area, and
the data acquisition unit further is configured, when the user authorizes downloading to update of the map data of the specific area in response to the map data acquisition unit requesting the user authorization of said downloading, to acquire the map data for map data updating of the specific area from the information center through the communication unit,
the map data acquisition unit allows the user to select one of an automatic update mode for automatically updating the map data through acquiring the map data and an inquiry update mode for updating the map data after making an inquiry about map data updating to the user.

2. A navigation apparatus having the map data utilization apparatus of claim 1,
wherein a function of route navigation that provides a navigation route towards a specified destination based on the map data is provided.

3. A navigation apparatus having the map data utilization apparatus of claim 1, wherein a function of route navigation that provides a navigation route towards a specified destination based on the map data is provided by said navigation apparatus having the map data utilization apparatus.

4. A map data utilization apparatus comprising:
a storage that stores map data to be utilized in a process that is executed in the map data utilization apparatus, wherein the map data is capable of being updated by an area of a predetermined range in a map;
a communication unit that communicates with an external information center;
a list acquisition unit that acquires a version list of the map data for updating respective areas in the map;
a map data acquisition unit that acquires map data from the external information center by the communication unit, wherein the map data acquisition unit compares a version of the map data of a specific area with a version of the map data in the version list for map data updating so as to acquire the map data of the specific area when the version of the map data of the specific area is different from the version of the map data of a same area in the version list for map data updating;
a map data update unit that updates the map data of the specific area stored in the storage based on map data that is acquired by the map data acquisition unit for map data updating; and a position detector that detects a current position of a mobile body of the map data utilization apparatus for a mobility of the apparatus,
wherein
the map data acquisition unit compares the version of the map data of an area that includes the current position of the mobile body with the version of the map data of a same area in the version list for map data updating when the current position is updated based on a detection result of the position detector, the map data acquisition unit is configured, after the comparison is performed by the map data acquisition unit, when the version of the map data of the specific area is determined to be different from the version of the map data of the same area in the version list for map data updating, before acquiring the map data of the specific area from the external information center, to interact with a user to request a user authorization of downloading to update the map data of the specific area, and the map data acquisition unit is further configured, when the user authorizes downloading to update the map data of the specific area in response to the map data acquisition unit requesting the user authorization of said downloading, to acquire the map data for map data updating of the specific area from the information center through the communication unit.

5. The map data utilization apparatus of claim 4, wherein when the version of the map data of an area including the current position which is updated is different from the version of map data of the same area in the version list, the map data acquisition unit acquires the map data for the map data updating by the communication unit from the external information center.

6. A map data utilization apparatus comprising:

a storage that stores map data to be utilized in a process that is executed in the map data utilization apparatus, wherein the map data is capable of being updated by an area of a predetermined range in a map;

a communication unit that communicates with an external information center;

a list acquisition unit that acquires a version list of the map data for updating respective areas in the map;

a map data acquisition unit that acquires map data from the external information center by the communication unit, wherein the map data acquisition unit compares a version of the map data of a specific area with a version of the map data in the version list for map data updating so as to acquire the map data of the specific area when the version of the map data of the specific area is different from the version of the map data of a same area in the version list for map data updating; and a map data update unit that updates the map data of the specific area stored in the storage based on map data that is acquired by the map data acquisition unit for map data updating, wherein the map data includes POI information that specifies attributes of a point of interest (POI), the map data is capable of being utilized in a predetermined process regarding the POI, the map data acquisition unit compares the version of the map data of an area that includes a position of the POI with the version of the map data of a same area in the version list for map data updating when a user provides an instruction of specifying the POI, wherein, the map data acquisition unit is configured, after the comparison is performed by the map data acquisition unit, when the version of the map data of the specific area is determined to be different from the version of the map data of the same area in the version list for map data updating, before acquiring the map data of the specific area from the external information center, to interact with a user to request a user authorization of downloading to update the map data of the specific area, and the map data acquisition unit further is configured, when the user authorizes downloading to update the map data of the specific area in response to the map data acquisition unit requesting the user authorization of said downloading, to acquire the map data for map data updating of the specific area from the information center through the communication unit.

7. The map data utilization apparatus of claim 5, wherein when the version of the map data of the area that includes the position of the POI is different from the version of the map data of the same area in the version list, the map data acquisition unit acquires the map data for the map data updating by the communication unit from the external information center.

8. A map data utilization apparatus comprising:

a storage that stores map data to be utilized in a process that is executed in the map data utilization apparatus, wherein the map data is capable of being updated by an area of a predetermined range in a map;

a communication unit that communicates with an external information center;

a list acquisition unit that acquires a version list of the map data for updating respective areas in the map;

a map data acquisition unit that acquires map data from the external information center by the communication unit, wherein the map data acquisition unit compares a version of the map data of a specific area with a version of the map data in the version list for map data updating so as to acquire the map data of the specific area when the version of the map data of the specific area is different from the version of the map data of a same area in the version list for map data updating;

a map data update unit that updates the map data of the specific area stored in the storage based on map data that is acquired by the map data acquisition unit for map data updating; and a display unit that displays a map image based on the map data, wherein, when a geographical area of a map to be displayed on the display unit is changed, the map data acquisition unit compares the version of the map data of a display area after display area change with the version of the map data of a same area in the version list for map data updating, the map data acquisition unit is configured, after the comparison is performed by the map data acquisition unit, when the version of the map data of the specific area is determined to be different from the version of the map data of the same area in the version list for map data updating, before acquiring the map data of the specific area from the external information center, to interact with a user to request a user authorization of downloading to update the map data of the specific area, and the map data acquisition unit further is configured, when the user authorizes downloading to update the map data of the specific area in response to the map data acquisition unit requesting the user authorization of said download, to acquire the map data for map data updating of the specific area from the information center through the communication unit.

9. The map data utilization apparatus of claim 8, wherein, when the geographical area of the map to be displayed on the display unit is changed by scrolling, the map data acquisition unit compares the version of the map data of the display area after display area change with the version of the map data of a same area in the version list for map data updating.

* * * * *